United States Patent
Van Nieuwstadt et al.

(10) Patent No.: US 9,599,062 B2
(45) Date of Patent: Mar. 21, 2017

(54) METHOD OF PILOT INJECTION CONTROL

(71) Applicant: Ford Global Technologies, LLC, Dearborn, MI (US)

(72) Inventors: Michiel J. Van Nieuwstadt, Ann Arbor, MI (US); Brien Lloyd Fulton, West Bloomfield, MI (US); Aaron John Oakley, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 14/444,766

(22) Filed: Jul. 28, 2014

(65) Prior Publication Data

US 2016/0025031 A1 Jan. 28, 2016

(51) Int. Cl.
*F02D 41/40* (2006.01)
*F02D 41/24* (2006.01)

(52) U.S. Cl.
CPC ......... *F02D 41/403* (2013.01); *F02D 41/247* (2013.01); *F02D 41/2477* (2013.01); *F02D 41/2441* (2013.01); *F02D 41/402* (2013.01); *F02D 41/405* (2013.01); *Y02T 10/44* (2013.01)

(58) Field of Classification Search
CPC .... F02D 41/403; F02D 41/402; F02D 41/405; F02D 41/247; F02D 41/2477; F02D 41/2441; Y02T 10/44
USPC .... 701/104, 111; 73/114.45, 114.48, 114.49; 123/299, 300
See application file for complete search history.

(56) References Cited

U.S. PATENT DOCUMENTS

| | | | |
|---|---|---|---|
| 5,685,270 A | 11/1997 | Sekiguchi et al. | |
| 6,102,005 A * | 8/2000 | Kasen | F02D 41/38 123/446 |
| 6,470,849 B1 * | 10/2002 | Duffy | F02D 41/403 123/299 |
| 6,748,928 B2 * | 6/2004 | Shingole | F02D 41/365 123/480 |
| 6,755,176 B2 * | 6/2004 | Takeuchi | F02D 41/0085 123/299 |
| 6,990,855 B2 * | 1/2006 | Tuken | F02D 41/2496 73/114.38 |
| 7,025,047 B2 * | 4/2006 | Leman | F02D 41/2467 123/478 |
| 7,415,964 B2 * | 8/2008 | Ban | F02D 41/20 123/299 |
| 7,647,161 B2 * | 1/2010 | Haraguchi | F02D 35/028 123/299 |
| 7,792,631 B2 * | 9/2010 | Bottcher | F02D 41/0072 123/698 |

(Continued)

OTHER PUBLICATIONS

Carlucci, P. et al., "Effects of Pilot Injection Parameters on Combustion for Common Rail Diesel Engines," SAE Technical Paper 2003-01-0700, 2003, doi:10.4271/2003-01-0700, 14 pages.

*Primary Examiner* — Stephen Cronin
*Assistant Examiner* — Susan E Scharpf
(74) *Attorney, Agent, or Firm* — Julia Voutyras; John D. Russell; B. Anna McCoy

(57) ABSTRACT

Various methods and systems are provided for adjusting a pilot injection during initial engine operation from vehicle manufacture. In one example, a method comprises delivering a first proportion of fuel as the pilot injection, and only decreasing the first proportion of fuel responsive to learning an injector flow characteristic.

20 Claims, 8 Drawing Sheets

(56) References Cited

U.S. PATENT DOCUMENTS

| | | | | |
|---|---|---|---|---|
| 7,845,335 B2* | 12/2010 | Yun | ............................ | F02B 1/12 |
| | | | | 123/406.55 |
| 7,904,233 B2* | 3/2011 | Kweon | ................. | F02D 35/023 |
| | | | | 123/299 |
| 8,527,182 B2* | 9/2013 | Minami | ............... | F02D 41/1402 |
| | | | | 123/434 |
| 8,532,903 B2 | 9/2013 | Ueda et al. | | |
| 2007/0012283 A1* | 1/2007 | Rockwell | ............... | F02D 41/064 |
| | | | | 123/299 |
| 2008/0060617 A1* | 3/2008 | Adachi | ................. | F02D 31/007 |
| | | | | 123/447 |
| 2008/0120962 A1* | 5/2008 | Okugawa | ............... | F02M 26/05 |
| | | | | 60/274 |
| 2008/0228374 A1* | 9/2008 | Ishizuka | ............. | F02D 41/3809 |
| | | | | 701/103 |
| 2009/0192699 A1* | 7/2009 | Bottcher | ............. | F02D 41/0072 |
| | | | | 701/108 |
| 2009/0254262 A1* | 10/2009 | Kweon | ................. | F02D 35/023 |
| | | | | 701/104 |
| 2011/0023467 A1* | 2/2011 | Kong | .................... | F02D 41/029 |
| | | | | 60/287 |
| 2011/0137541 A1* | 6/2011 | Malikopoulos | ..... | F02D 41/1406 |
| | | | | 701/106 |

* cited by examiner

METHOD OF PILOT INJECTION CONTROL

TECHNICAL FIELD

The present application relates generally to an internal combustion engine having multiple injections per cylinder per combustion cycle.

BACKGROUND AND SUMMARY

Compression ignition (CI) engines may rely on multiple injections of fuel per combustion stroke for benefits such as reduced emissions and lowered combustion noise. Small variations in quantities of these injections may produce undesirable effects such as a substantial increase in emissions as well as noise, vibration, and harshness (NVH). Accordingly, injector flow may be continuously monitored and adapted so that a desired fuel quantity is accurately provided to the cylinders. In the example of new fuel injectors, flow characteristics may be learned on bench before the injectors are installed in an engine of a new vehicle. Additionally, these flow characteristics may be programmed into a controller of the vehicle to reduce the likelihood of increased emissions and NVH when operating the new vehicle.

The inventors herein have identified potential issues with the above approach. For example, a time to learn flow characteristics on bench for a pilot injection may not be adequate. In general, the desired offset to accurately deliver a quantity of the pilot injection may be learned only after driving at least 100-2000 miles under very specific driving conditions. Further, the engine assembly process may include labelling of fuel injectors with determined flow characteristics, marking of the engine label with the injector information, and calibration of the flow characteristics into the controller. These procedures can increase engine assembly times resulting in a significant increase in costs. Errors during labeling and programming may also occur during these procedures. Similar issues may also arise during vehicle service and maintenance. Furthermore, errors in calibrating the pilot injection may lead to shortened injector opening times, and in some cases, the pilot injection may be dropped altogether. These errors in pilot injection amounts and the longer durations needed for learning injection quantities can have adverse effects on cylinder pressure, emissions, and fuel economy, and may also increase NVH. Further still, while adaptation algorithms in a vehicle can learn and correct for errors in larger fuel quantities, inaccuracies in smaller pilot injections may need longer times to be corrected.

The inventors herein have recognized the above issues and have identified approaches to at least partially address them. In one example approach, a method for controlling a pilot injection is provided. The method comprises, during initial engine operation from vehicle manufacture, delivering a first proportion of fuel as a pilot injection, and only decreasing the first proportion of fuel responsive to learning of an injector flow characteristic. The first proportion of fuel delivered as the pilot injection may be a large enough quantity to ensure all injectors are injecting sufficient fuel. In this way, an engine may be operated such that fueling via the pilot injection may be assured.

For example, an engine in a newly manufactured vehicle may be operated with multiple injections per combustion cycle per cylinder wherein a first, larger predetermined proportion of fuel may be supplied as a pilot injection. The pilot injection may be followed by a main injection, which in turn may be followed by a post injection. A controller in the vehicle may monitor and learn flow characteristics of each fuel injector coupled to each cylinder in the engine. Further, the controller may learn the injector flow characteristics during different engine operating conditions such as idling, coast down, etc. Based on the learned injector flow characteristics, the first larger proportion of pilot injection may only be adjusted downward as initial engine operation continues. In one example, initial engine operation may be a given number of miles driven after initial vehicle manufacture. In another example, initial engine operation may include conditions when learned injector flow characteristics attain a stable value. Once initial engine operation is completed, adjustments to the pilot injection may be upward or downward.

In this way, a pilot injection may be assured to be a part of each multiple injection event. By commanding a predetermined larger proportion of pilot injection initially, a likelihood of omitting the pilot injection may be reduced. A controlled rate of air charge combustion may be maintained as injector flow characteristics for each new injector are learned and the pilot injection is adjusted downward. Further, the injector flow characteristics may be learned faster due to the initial larger setting which provides an initial higher gain. Additionally, by programming the larger proportion of initial pilot injection and learning desired pilot injection quantity during driving, on bench learning and encoding of an injector may be reduced enabling a decrease in injector production costs. Overall, benefits such as improved emissions compliance, reduced combustion noise, and cost savings may be attained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
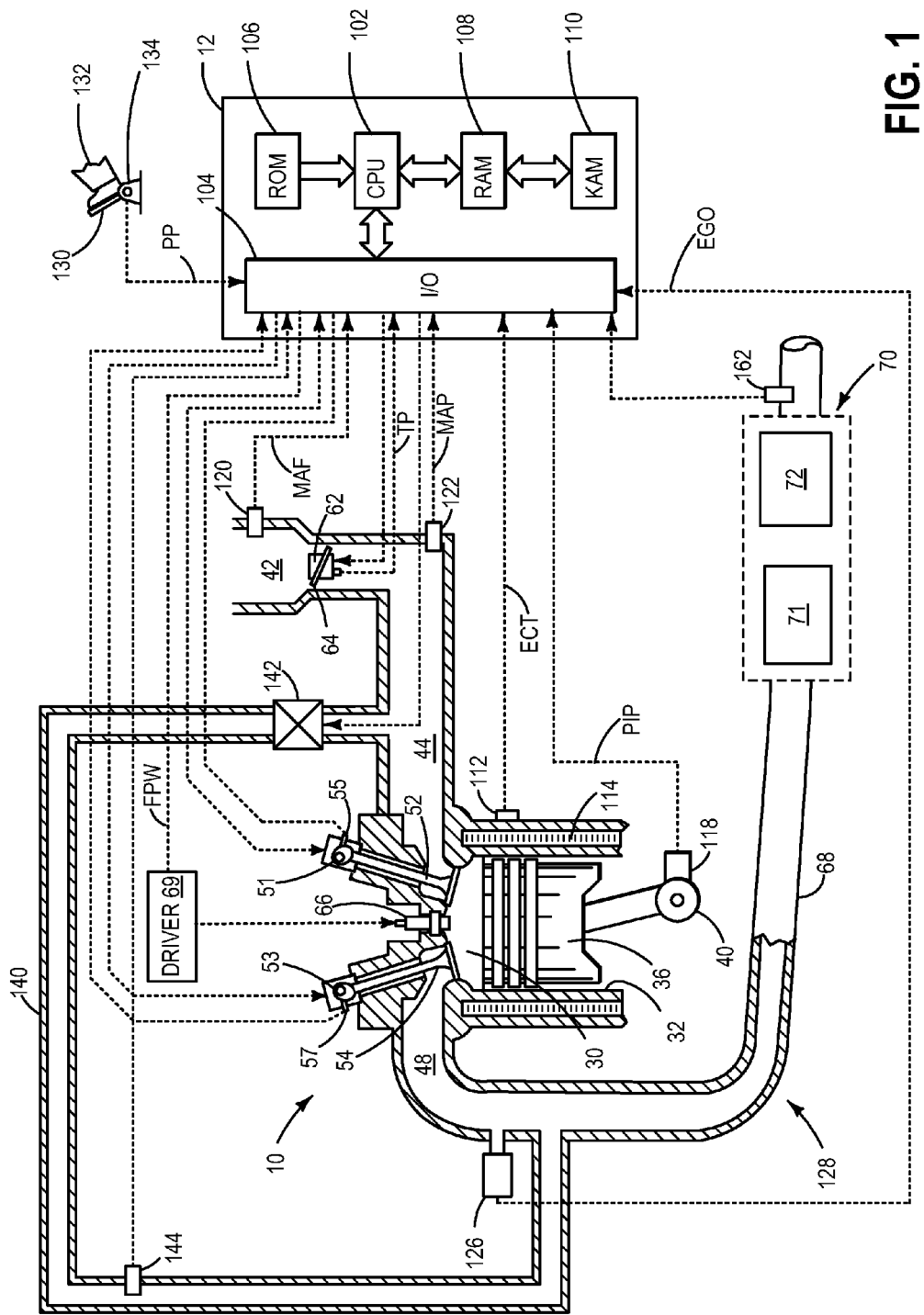
FIG. 1 shows a schematic diagram of an engine.
Figure 2:
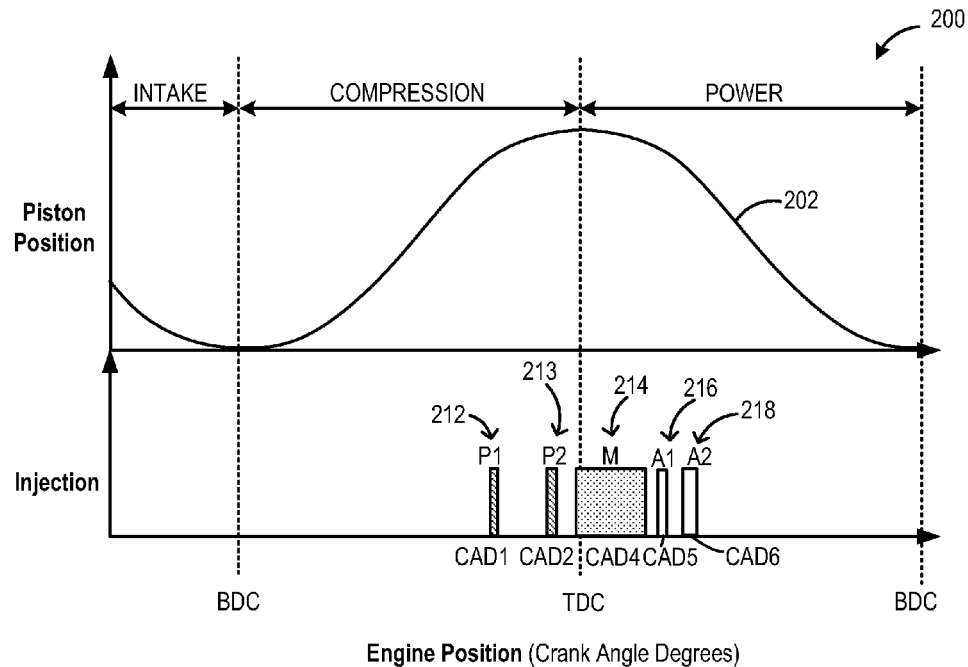
FIG. 2 illustrates an example timing chart illustrating multiple fuel injections with respect to piston position.
Figure 3:
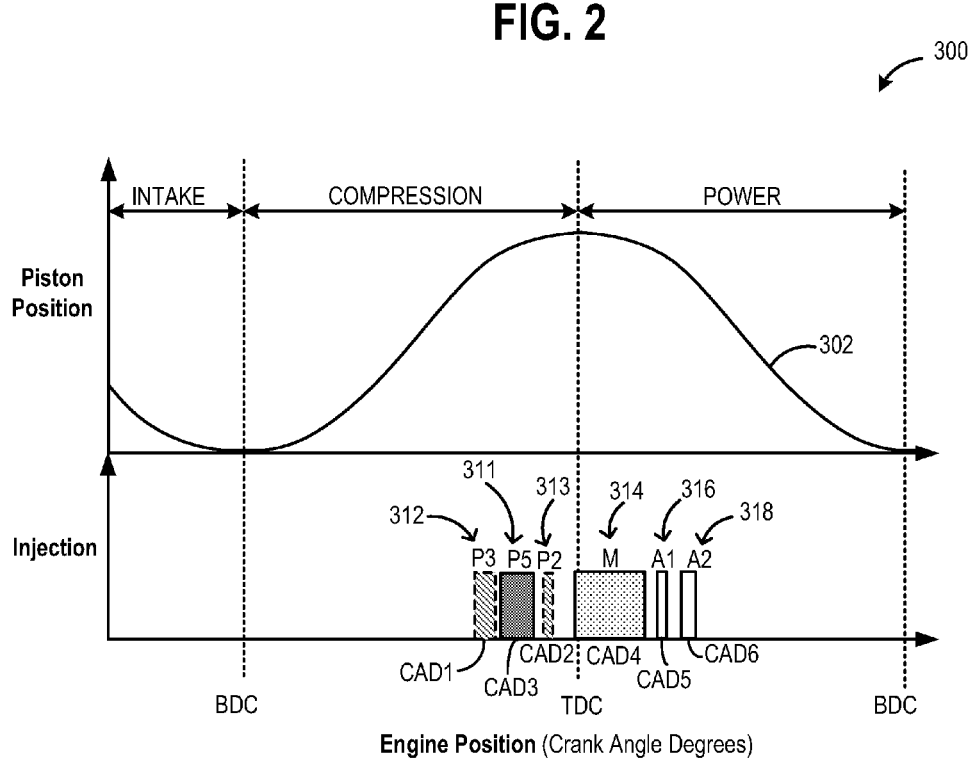
FIG. 3 depicts a timing chart illustrating an example modification to the multiple fuel injections, in accordance with the present disclosure.
Figure 4:
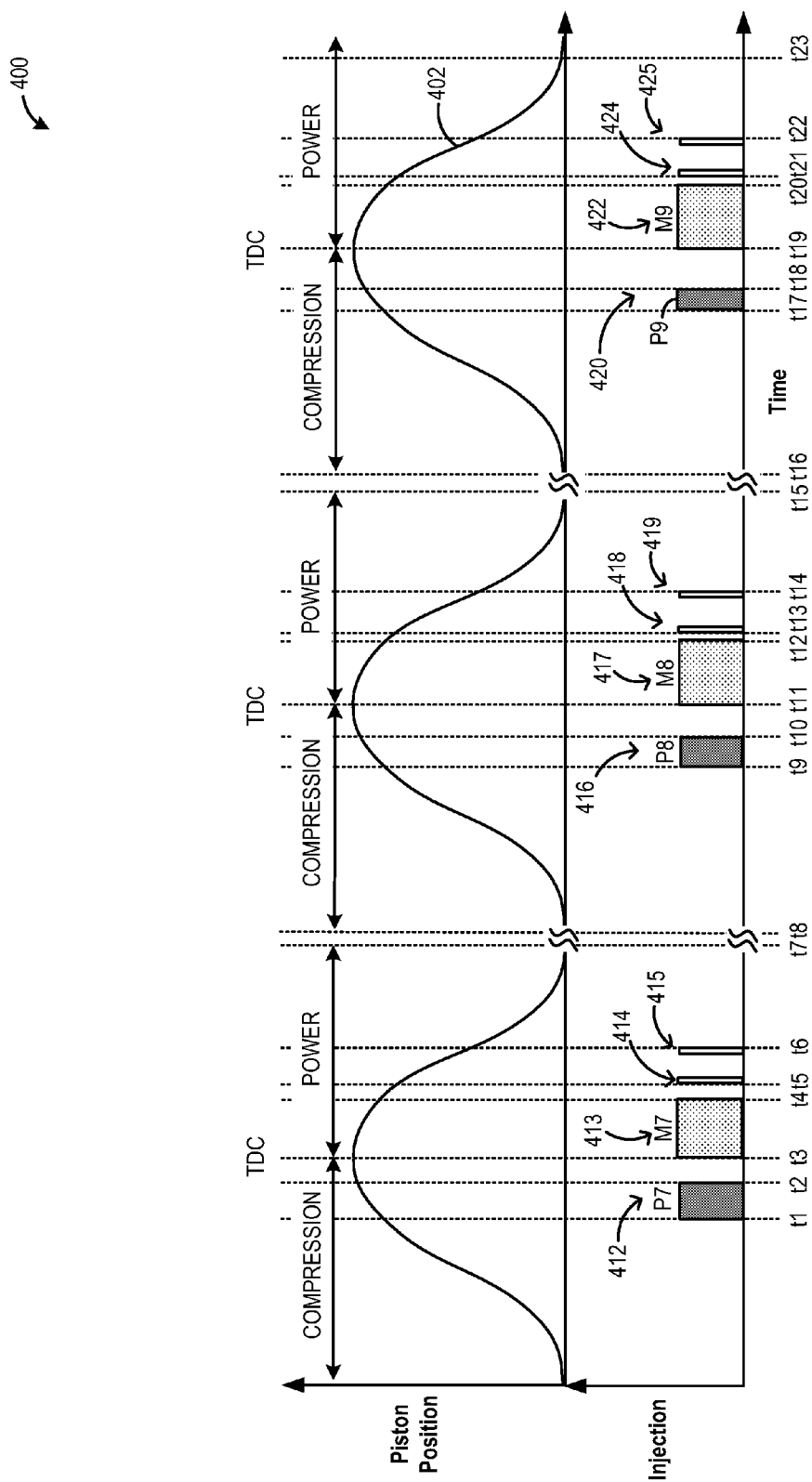
FIG. 4 is an example variation in pilot injection with time, according to the present disclosure.

The following description relates to a method for controlling and adjusting pilot injection quantity in an engine system, such as the engine system of FIG. 1, in a newly manufactured vehicle. The engine may typically be operated with multiple injections per combustion cycle in a given cylinder stroke as shown in FIG. 2. During initial vehicle operation after manufacture, a larger quantity of fuel may be supplied as a pilot injection (FIG. 3). Further, as a mileage of initial vehicle operation increases, injector flow characteristics such as fuel mass and injected quantity may be learned under various conditions (FIGS. 5-9) and the quantity of pilot injection may be adapted downward based on the learning (FIG. 4). Injector flow characteristics may be learned during idling conditions to maintain a desired idle speed (FIG. 10) and maintain cylinder balance (FIG. 11). Overall, by initiating engine operation with a larger quantity of pilot injection, NVH issues may be reduced. The initial larger quantity of pilot injection may be adjusted downward as a controller learns and adapts to driving conditions.

Referring now to FIG. 1, it shows a schematic diagram with one cylinder of multi-cylinder engine 10, which may be included in a propulsion system of a vehicle. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber 30 (also termed, cylinder 30) of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust manifold 48 to exhaust passage 68. The intake manifold 44 and the exhaust manifold 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein in proportion to the pulse width of signal FPW received from controller 12 via electronic driver 69. In this manner, fuel injector 66 provides what is known as direct injection of fuel into combustion chamber 30. It will also be appreciated that the cylinder 30 may receive fuel from a plurality of injections during a combustion cycle. In other examples, the fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 68 to the intake manifold 44 via an EGR passage 140. The amount of EGR provided may be varied by controller 12 via an EGR valve 142. By introducing exhaust gas to the engine 10, the amount of available oxygen for combustion is decreased, thereby reducing combustion flame temperatures and reducing the formation of $NO_x$, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust manifold 48 upstream of an emission control system 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor.

Emission control system 70 is shown arranged along exhaust passage 68 downstream of exhaust gas sensor 126. Emission control system 70 may be a selective catalytic reduction (SCR) system, three way catalyst (TWC), $NO_x$ trap, various other emission control devices, or combinations thereof. For example, emission control system 70 may include an SCR catalyst 71 and a diesel particulate filter (DPF) 72. In some embodiments, DPF 72 may be located downstream of the SCR catalyst 71 (as shown in FIG. 1), while in other embodiments, DPF 72 may be positioned upstream of the SCR catalyst 71 (not shown in FIG. 1). Emission control system 70 may further include exhaust gas sensor 162. Sensor 162 may be any suitable sensor for providing an indication of a concentration of exhaust gas constituents such as a $NO_x$, $NH_3$, etc. and may be an EGO or particulate matter (PM) sensor, for example. In some embodiments sensor 162 may be located downstream of DPF 72 (as shown in FIG. 1), while in other embodiments, sensor 162 may be positioned upstream of DPF 72 (not shown in FIG. 1). Further, it will be appreciated that more than one sensor 162 may be provided in any suitable position.

Further, in some embodiments, during operation of engine 10, emission control system 70 may be periodically reset by operating at least one cylinder of the engine within a particular air/fuel ratio.

Controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor, absolute manifold pressure signal, MAP, from the sensor 122; and exhaust constituent concentration from the exhaust gas sensors 126 and 162. Engine speed signal, RPM, may be generated by controller 12 from signal PIP. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In addition to the above sensors, a combustion sensor (not shown) may be coupled to an individual cylinder on a per cylinder basis. The combustion sensor may be an appropriate sensor as known in the art for example a knock sensor, a vibration sensor, a temperature sensor, a pressure sensor, etc. or any combination thereof. The combustion sensor may sense combustion relevant parameters such as a peak pressure value, the location of a peak pressure, the timing of a peak pressure, or any combination thereof, for example.

The storage medium read-only memory 106 can be programmed with non-transitory, computer readable data representing instructions executable by the processor 102 for performing the routines described below as well as other variants that are anticipated but not specifically listed. Example routines are described herein with reference to FIGS. 5-9.

As described above, FIG. 1 shows only one cylinder of a multi-cylinder engine, and each cylinder may similarly include its own set of intake/exhaust valves, fuel injector, etc.

Turning now to FIGS. 2 and 3, they show examples of injection profiles with respect to piston position, for one cylinder within an engine, such as engine 10 of FIG. 1. Each injection profile includes multiple injection events within a single combustion cycle. One example of a fuel injection profile, shown in FIG. 2, includes two pilot injections followed by one main injection which is followed by two post injections. A second example, portrayed in FIG. 3, represents a fuel injection profile according to the present disclosure including a single relatively larger pilot injection, followed by a main injection which is followed by two post injections. The second example may be used when one or more fuel injectors have not been calibrated on bench for pilot injection quantities.

Map 200 of FIG. 2 and map 300 of FIG. 3 illustrate an engine position along the x-axis in crank angle degrees (CAD). Referring now to the top plots in each map, curves 202 and 302 depict piston positions (along the y-axis) with reference to their location from top dead center (TDC) and/or bottom dead center (BDC), and further with reference to their location within the four strokes (intake, compression, power and exhaust) of an engine cycle. Maps 200 and 300 specifically depict only the compression and power strokes to demonstrate fuel injections occurring at or around TDC piston position between the compression and power strokes. As indicated by sinusoidal curves 202 and 302, a piston gradually moves upward from BDC (after completing an intake stroke) to TDC by the end of a compression stroke. The piston then returns to BDC by the end of the power stroke.

The bottom plots in each of maps 200 and 300 depict a fuel injection profile. Engine 10 may be a compression ignition engine which, as a non-limiting example, may be combusted by a fuel such as diesel. In order to enhance combustion, reduce emissions and NVH, multiple injections may fuel each cylinder during each respective combustion stroke. As a first example, in map 200, an engine controller may be configured to provide the total amount of fuel to the cylinder as five injections: a first pilot injection 212 at CAD1 (hatched block), a second pilot injection 213 at CAD2 (hatched block), a main injection 214 at CAD4 (dotted block), a first post injection 216 at CAD5 (unfilled block), and a second post injection 218 at CAD6 (unfilled block).

In one example, the first pilot injection may be delivered at 40 CAD before TDC and the second pilot injection may be supplied at about 15 CAD before TDC. Further, the main injection may be introduced into the cylinder at exactly TDC or just slightly before TDC (e.g. 5 CAD before TDC). The first post injection may be injected at about 35 CAD after TDC while the second post injection may be provided about 50 CAD after TDC.

Other embodiments may include a different number (more or fewer than five) of injections within the profile. For example, the profile may include a single pilot and main injection. In yet other embodiments, the injections may be delivered at different timings than those shown in map 200.

Further still, duration of each injection may be varied, than that shown in map 200, to deliver higher or lower amounts of fuel.

As shown in the example of map 200, the first pilot injection 212 delivers a first portion of fuel (P1) while the second pilot injection 213 supplies a second portion of fuel (P2). The main injection 214 may introduce a third portion of fuel (M), the first post injection 216 may supply a fourth portion of fuel (A1), and the second post injection 218 may provide a fifth portion of fuel (A2). In one example, the pilot injection quantity may be 1-20% of the total injected fuel depending upon the total quantity demanded and injector minimum delivery quantity at a respective rail pressure, post injection quantity may be 2-25% of the total fuel, and the main injection may provide 55-98% of the total fuel. Therefore, P1 and P2 may each be up to 10% of the total fuel, and each of A1 and A2 may be up to 12% of the total fuel. For example, in a 6.7 L engine operating at an idle condition, total amount of fuel delivered may be 10 mg/stroke. Herein, idle pilot quantities can range from 7% (or 0.7 mg/stroke as minimum delivery) to 20% (or 2 mg/stroke). Post injection quantities may also be in the range of 7% to 20%, and main injection quantities may be in the range of 60% to 85%. In another example, P1 and P2 may each be 2-25% of the total fuel, M may be 55-99% of the total fuel, and each of A1 and A2 may be 3-45% of the total fuel. In an example of a 3.2 L engine that operates with about 7 mg/stroke, pilot injection quantities can be about 2 mg/stroke or higher. Other examples may include different proportions of fuel delivered by the pilot, main, and post injections without departing from the scope of this disclosure.

It will be appreciated that herein fuel injections delivered prior to a main injection are termed pilot injections while fuel injections delivered after the main injection are termed post injections. In other examples, the second pilot injection (213) may be termed pre-injection while the first and second post injections may be termed after-injections. In yet other examples, multiple injections may also be known as split injections.

An embodiment of a fuel injection profile according to the present disclosure is presented in map 300 as a second example. The depicted second example may be a fuel injection profile programmed into a brand new fuel injector for initial engine operation, e.g. during a learning phase by the controller. In one example, the learning phase of the controller may extend at least through the first 100 miles of initial vehicle operation (from manufacture). In another example, the learning phase may include up to 2000 miles of vehicle operation from vehicle manufacture. In yet another example, the learning phase may include a given number of operating hours after vehicle manufacture. The controller may learn injector flow characteristics such as fuel mass and individual injector fuel quantity during the learning phase.

In map 300, the first and second pilot injections of map 200 may be replaced by a single "fat" pilot injection 311 at CAD3 (densely dotted block) delivered prior to the main injection 314 at CAD4 (sparsely dotted block). The "fat" pilot may be a relatively larger value that is larger than would ever be expected, and thus at the extreme large end of possible values that could be possible. The selection of the fat pilot injection quantity may be such that the injection quantity is large enough to accommodate injection variation in the entire production population of injectors. Further, the fat pilot injection quantity may be selected so that all injectors may deliver an injection quantity such that an overwhelming portion of the population's corrective learning of the injection 311 only ever occurs in the decreasing direction.

The fuel injection profile in map 300 may include four injections per combustion stroke. As shown at 311, the amount of fuel supplied in the single pilot injection (P5) at CAD3 may be larger than each of the amount of fuel supplied by first pilot injection 212 (P1) and the second pilot injection 213 (P2). In another example, the single pilot injection 311 may be a higher amount relative to the combined amounts of P1 and P2. For example, the single pilot injection 311 may deliver 5-10% (up to 25% at idle) of the total amount of fuel during initial engine operation. The portion of the single pilot injection may change as the total quantity of injected fuel increases.

A fuel injector may deliver a larger quantity of fuel as the single pilot injection by being held open for a longer duration (as shown). In one example, the single pilot injection may begin at 35 CAD before TDC (in the compression stroke). In another example, the single pilot injection may commence at 5 CAD before TDC. In each example, an end of the single pilot injection may depend upon on existing fuel rail pressure. Other timings and durations may be possible without departing from the scope of the present disclosure. As the amount of fuel delivered by the single pilot injection is increased, the amounts of fuel delivered by the main injection, and the first and second post injections may be reduced correspondingly.

It will be appreciated that some of the injection timings shown in map 300 may be similar to that shown in the injection profile of map 200, e.g. main injection 314 at CAD4, first post injection 316 at CAD5, and second post injection 318 at CAD6.

In an alternate embodiment depicted in map 300, instead of injecting a larger portion of fuel as a single fat pilot injection, either the first pilot injection or the second pilot injection may deliver a larger quantity of fuel. For example, the first and the second pilot injections may be retained instead of being replaced by a single pilot injection as described earlier. In one example, the first pilot injection 312 at CAD1 (hatched block with dashed border) may deliver a larger quantity of fuel (P3) than that delivered as 212 (P1) of map 200. Herein, the second pilot injection 313 at CAD2 (hatched block with dashed border) may deliver the same quantity of fuel (P2) as that delivered as 213 of map 200. Thus, the amount of fuel delivered as P3 may be larger than the amount of fuel supplied as P1. However, the amounts of fuel delivered as P2, M, A1, and A2 (and their timings) may be the same as in the earlier example of map 200. Alternatively, the amounts of fuel delivered as main injection, and post injections may be reduced as the amount of fuel delivered by the first pilot injection is increased.

In yet another embodiment (not shown in map 300), the first pilot injection quantity may remain the same as that delivered as 212 in map 200 (P1) while the second pilot injection 313 may be increased relative to the second pilot injection 213 of map 200.

Thus, during an initial phase of vehicle operation (from manufacture), a fuel injector may be programmed to deliver a larger quantity of fuel as a pilot injection quantity. By programming a vehicle controller to command an initial higher proportion of fuel in the pilot injection, chances of a lower quantity of fuel being delivered as pilot injection may be lowered. Further, the presence of the pilot injection in the multiple injection profile may be assured. Accordingly, NVH and emissions may be better controlled.

Turning now to FIG. 4, it shows map 400 illustrating changes in fuel injection profile with time within one cylinder. The cylinder may be included in a new engine in a new vehicle fitted with new injectors. Alternatively, the cylinder may be part of an older vehicle with one or more newly installed fuel injectors. Adjustments to the fuel injection profile may be due to a learning and adaptive phase during initial engine operation after vehicle manufacture. In the alternate embodiment, the changes in fuel injection profile may be due to a learning and adaptive phase during initial engine operation after injector replacement within the cylinder.

Curve 402 in the top plot of map 400 depicts piston positions (along the y-axis) with reference to their location from top dead center (TDC) and/or bottom dead center (BDC), and further with reference to their location within the four strokes (intake, compression, power and exhaust) of an engine cycle. As such, curve 402 is similar to curves 202 and 302 and specifically represents piston positions within multiple compression and power strokes. Map 400 also includes time plotted along the x-axis and in the bottom plot, depicts fuel injection profiles. The illustrated example is for the embodiment of the single "fat" pilot injection replacing the first and second pilot injections, as described earlier in reference to FIG. 3 (map 300).

Similar to map 300, the fuel injection profile in each combustion cycle includes four injections: a single pilot injection, a main injection, and two post injections. At t1, a pilot injection 412 may commence towards the end of a compression stroke (towards TDC). The injector may close at t2 and deliver a first portion P7 as the pilot injection by time t2. At t3 (coincides with TDC), a main injection 413 may begin and may deliver a portion M7 by the time it ends at t4. In the same cycle, a first post injection 414 may begin at t5 and be followed by a second post injection 415. The post injections may be completed by t6, and by t7 the power stroke may conclude. As mentioned earlier, the injection profile between time t1 and t7 may represent fueling in an engine in a new vehicle during initial operation from vehicle manufacture. Alternatively, the profile may be commanded of a brand new injector installed in an older vehicle. Further, as described earlier, the initial larger pilot injection may be commanded during a learning phase when a controller in the vehicle learns various injector flow characteristics of the new injector(s).

Between t7 and t8, a certain amount of time may pass and at t8, a compression stroke of another engine cycle may commence. The engine cycle portion shown between t8 and t15 may, in one example, immediately follow the cycle shown between t1 and t7. In another example, the portion of the engine cycle depicted between t8 and t15 may occur multiple cycles after the first cycle shown between t1 and t7. With each cycle, the controller may learn injector flow characteristics for the injectors and adapt the injection profile.

At t9, towards the end of the compression stroke, a portion P8 of fuel may be delivered as the pilot injection 416. By t9, the controller may have learned injector flow characteristics for the injector(s) coupled to the cylinder and may reduce the quantity of fuel delivered as the pilot injection. Thus, P8 is depicted as a smaller portion relative to portion P7. Further, the pilot injection may occur for a shorter duration between t9 and t10, and may end at t10. At t11, the main injection 417 may be provided within the cylinder. In one example, the portion of fuel supplied as the main injection may remain the same as M7. In another example, the portion of fuel delivered as the main injection may be different. In the depicted example, the main injection portion M8 is slightly higher than portion M7. During initial vehicle operation and the learning phase, the controller may only adjust the pilot injection downward. Therefore, if the engine is operating at a higher load, a higher amount of fuel may be delivered only as the main injection and not as the pilot injection. In other words, the main injection may be increased but the pilot injection may not be increased during the learning phase.

The main injection may be delivered by t12, and the first and second post injections may occur between t13 and t14. Further, the power stroke of this cycle may end at t15.

Next between t15 and t16, sufficient time may pass in the learning phase and the controller may continue to learn the injector flow characteristics. In one example, the compression and power strokes depicted between t16 and t23 may be part of a combustion cycle that occurs multiple cycles after the cycle shown between t8 and t15. Alternatively, the combustion cycle of t16-t23 may immediately follow the previous cycle (t8-t15).

At t16, a compression stroke of a subsequent cycle may begin. Between t17 and t18, the injector may deliver portion P9 of fuel as the pilot injection 420. As will be observed, the portion P9 is substantially smaller than earlier portions P7 and P8. By the time the controller commands portion P9, the learning phase may be nearly complete and the pilot injection quantity may be further reduced from the initial larger portion delivered between t1 and t2.

Between t19 and t20, main injection 422 may be provided as portion M9. Portion M9 may be the same as portion M8 or may be one of larger and smaller than portion M8. Between t21 and t22, the two post injections 424 and 425 may be delivered.

In this way, an initial larger pilot injection may be decreased over time as the controller learns the flow characteristics of the fuel injector(s). By delivering a larger quantity of fuel initially, a higher gain may be obtained enabling a faster downward learning of injector flow characteristics. During the initial phase of injector and/or vehicle operation and until injector flow characteristics continue to be learned, the pilot injection may only be adjusted downward from its initial larger quantity. It will be appreciated that some injectors of the population of injectors within the engine may learn faster than others depending upon the flow distributions of the entire population. For example, in a given cylinder coupled with at least two fuel injectors, each injector's flow characteristics may be learned separately during the learning phase. Further, the flow characteristics for each injector may be learned at different rates based on their flow distributions. As the initial learning phase continues, the pilot injection quantity in each injector may only be adjusted downward. Once the initial learning phase is complete, adjustments to the pilot injection may be made upward or downward. In the example of the cylinder coupled with at least two fuel injectors, flow characteristics of a first injector may be learned faster and its initial learning phase may be completed earlier than the remaining injector(s). Once the initial learning phase is accomplished for the first injector, adjustments to the pilot injection quantity for the first injector alone may be one of upward and downward. The pilot injection quantity in the remaining injector(s) will continue to be adjusted only downward until the respective initial learning phase is completed.

In the example of a learning phase during initial engine operation lasting for a predetermined number of miles after vehicle manufacture, initial vehicle operation and the learning phase may be considered complete at a mileage exceeding the predetermined number of miles. In the example of a learning phase including vehicle operation for a predetermined number of hours after vehicle manufacture, initial engine operation may be considered complete after the predetermined number of operational hours are concluded. Further, post-initial engine operation may also include engine operation after the attainment of stable values for the injector flow characteristic. Further, once vehicle operation continues beyond the maturing of the learning phase, pilot injection quantities may be different from the initial larger quantities.

Thus, an engine in a vehicle may be operated via multiple fueling events per combustion cycle. A method may comprise, during initial engine (and vehicle) operation from vehicle manufacture, delivering a first proportion of fuel as a pilot injection, and only decreasing the first proportion of fuel responsive to learning of an injector flow characteristic. Initial engine operation may include one of a given number of miles of vehicle operation after vehicle manufacture, a given number of operating hours after vehicle manufacture, and attainment of stable values for injector flow characteristics. The method may further include providing a second proportion of fuel during the combustion cycle as a main injection following the pilot injection, learning the injector flow characteristics, and adjusting the second proportion of fuel to both increase and decrease responsive to the learning. A third proportion of fuel may be injected as a post injection following the main injection, Further, upon learning the injector flow characteristics, the third proportion of fuel may be adjusted responsive to the learning. Herein, the adjustments may include each of increasing and decreasing the third proportion of fuel delivered as the post injection. In another example, the first proportion of fuel may be delivered as a first pilot injection and a second pilot injection in a single engine stroke such that the first proportion of fuel is split between the first pilot injection and the second pilot injection. Further, each of the first pilot injection and the second pilot injection may be only adjusted downward responsive to learning of the injector flow characteristic during initial engine operation from vehicle manufacture.

FIGS. 5-9 are example routines that a controller in a vehicle may perform during initial vehicle operation after manufacture while learning and adapting fuel injector flow characteristics in each cylinder in an engine of the vehicle. Alternatively, these routines may also be activated when one or more fuel injectors are replaced in the engine.

Figure 5:
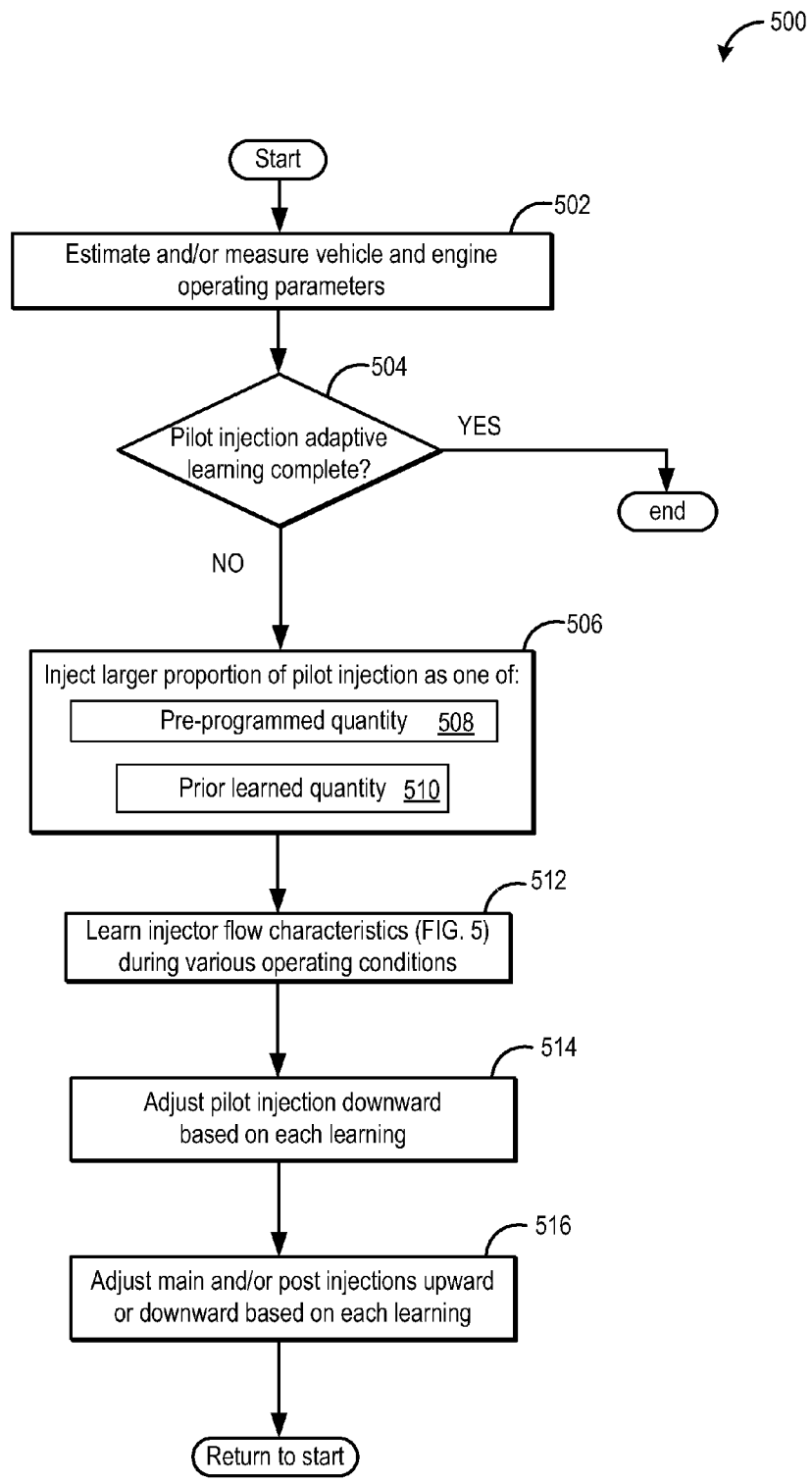
FIG. 5 portrays an example flowchart for adjusting a quantity of pilot injection, in accordance with the present disclosure.

FIG. 5 includes routine 500 for operating the engine with a first, larger proportion of fuel as a pilot injection until adaptive learning of the pilot injection is complete. Specifically, the adaptive learning adjusts the pilot injection quantity downward from the first, larger proportion until the learning matures and is completed.

At 502, routine 500 includes estimating and/or measuring engine and vehicle operating conditions. Example conditions such as vehicle speed, vehicle mileage, operator torque demand, accelerator pedal position, brake pedal position, engine speed, MAP, MAF, etc., may be estimated and/or measured. At 504, it may be determined if the adaptive learning phase for the pilot injection portion is complete. In one example, the learning phase may be complete once the vehicle has been driven for a given mileage after manufacture (or injector replacement). In one example, the given mileage may be 100 miles after vehicle manufacture. In another example, the learning phase may be considered complete after the vehicle mileage has reached 1500 miles from manufacture. Alternatively, the learning phase may be fulfilled after 100 miles of driving from injector replacement. In another example, the learning phase may be complete after the vehicle has operated for a certain number of hours. In yet another example, when injector flow characteristics (or offsets) have reached a stable value (or in another example, a minima), the learning phase may be considered complete. In still another embodiment, it may be determined that the adaptive learning phase is complete when the adjusted pilot injection offers a balance between fuel quantity, and desired combustion and NVH properties. Another example may include completing a predetermined drive distance or time of operation in a defined learning window.

If at 504, it is confirmed that the learning phase is concluded, routine 500 may end. On the other hand, if the adaptive learning phase is as yet incomplete, routine 500 may continue to 506 to command the injection of a larger portion of fuel as the pilot injection. Typically, the pilot injection may be 1-4% of the total amount of fuel injected. Therefore, in one example, the commanded larger proportion of pilot injection may be 5% of the total amount. In another example, the injector may be commanded to deliver 50% of the total fuel amount as the pilot injection, e.g. during an idle condition.

At 508, the pilot injection may include a pre-programmed quantity as the first, larger proportion of pilot injection. This pre-programmed amount may be used, for example, when the vehicle is brand new and has not been driven. Alternatively, at 510, the first larger pilot injection may be a quantity learned in the preceding learning phase. For example, in a vehicle that has been driven 40 miles from manufacture, the quantity of pilot injection delivered may be an amount learned between miles 39-40.

At 512, the routine may initiate or continue the learning of flow characteristics of each injector coupled to each cylinder in the engine. Further details of the learning will be described in reference to FIGS. 6-9. The injector flow characteristics may be learned during specific engine and vehicle operating conditions. As the flow characteristics are learned, routine 500 may adapt and adjust the fuel injection. At 514, the pilot injection may be adjusted downward based on each learning event. Further, at 516, the main injection may be adjusted upward or downward based on the learnings. Simultaneously, one or both post injections may be adjusted upward or downward in response to the learnings of the injector flow characteristics. Routine 500 may then return to start to repeat the adaptive learning.

It will be appreciated that while the pilot injection quantities are being learned and adjusted, other adaptation algorithms may simultaneously adjust the larger fuel quantities for the main injection and the post injections.

Figure 6:
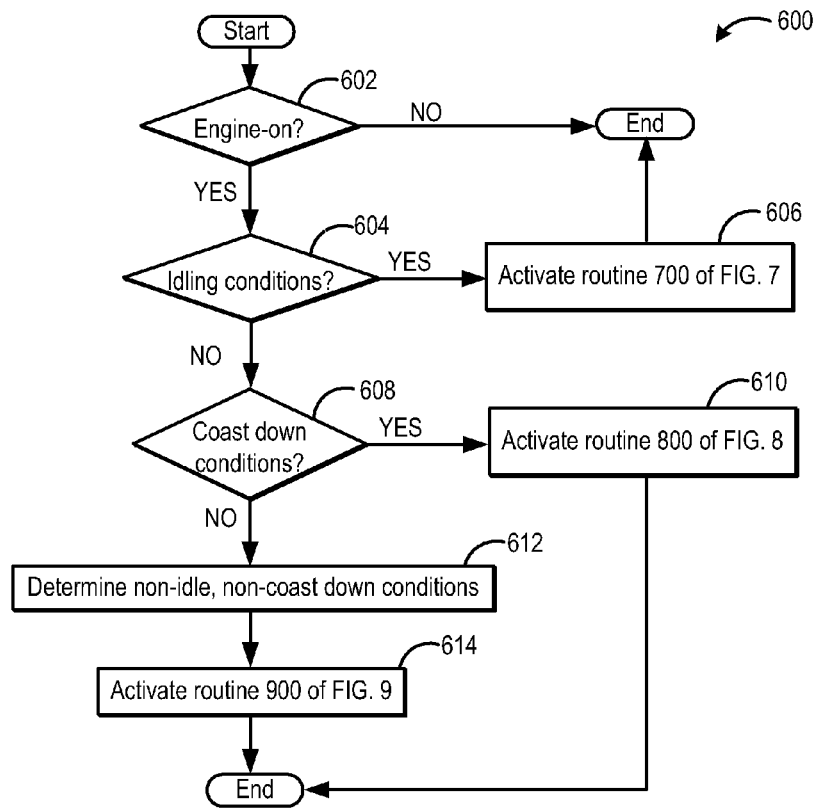
FIG. 6 is an example flowchart illustrating a method for learning an injector flow characteristic based on driving conditions.

Turning now to FIG. 6, it includes routine 600 for determining existing engine operating conditions, and for selecting a specific learning routine based on the existing operating condition.

At 602, routine 600 may determine if an engine-on condition is present. For example, the adaptive learning may be performed during active combustion in the engine-on condition. Thus, if it is determined that the engine is shut down and at rest, routine 600 ends. Else, routine 600 continues to 604 to determine if engine idling conditions are present. In one example, the engine may be idling following an engine start. In another example, if the engine is not equipped with a stop-start system, the engine may be idling at a traffic light. In an engine equipped with a stop-start system, the engine may be idling if power is being drawn to operate accessories such as the air conditioning system. During idling conditions, cylinders may be undergoing active combustion to provide an idle speed or slightly higher engine speed to operate accessories such as a radiator fan, a water pump, a condenser, etc.

Figure 7:
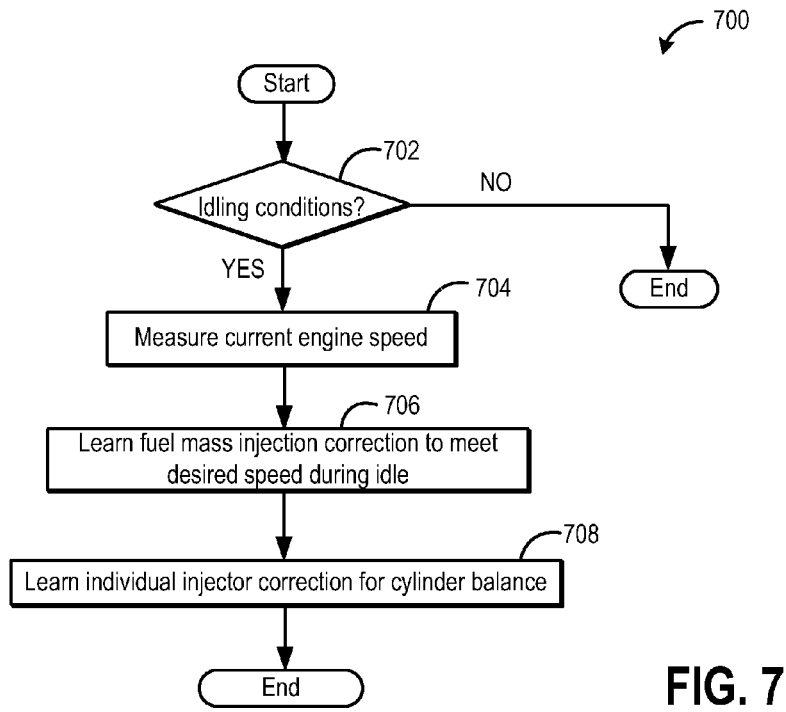
FIG. 7 depicts an example routine for learning injector flow characteristics during idling conditions.

If it is confirmed that idling conditions are present, routine 600 progresses to 606 to activate routine 700 of FIG. 7 which learns injector flow characteristics during idling conditions. Routine 700 will be elaborated in reference to FIG. 7 below. If idling conditions are not present, routine 600 continues to 608 to determine if coast down conditions are present. Coast down conditions may include vehicle speed being greater than zero with accelerator pedal in a released (foot-off) position. If coast down conditions are confirmed at 608, routine 600 continues to 610 to activate routine 800 of FIG. 8 which learns injector flow characteristics during coast down conditions. Further details will be elaborated below in reference to FIG. 8. If coast down conditions are not confirmed, routine 600 determines the presence of non-idling, non-coast down conditions at 612. Next, at 614, routine 900 of FIG. 9 may be activated to learn injector flow characteristics during these conditions. Routine 900 will be further explained in reference to FIG. 9.

Turning now to FIG. 7, routine 700 is illustrated for performing an adaptive learning during idling conditions. Specifically, injector flow characteristics such as fuel quantity and fuel mass may be learned to adjust pilot injection quantities.

At 702, a presence of idling conditions may be confirmed. Engine idle may provide suitable conditions for learning desired pilot injection quantities because injected fuel amounts during idle are smaller. Since combustion noise may be more noticeable during idling, pilot injection amounts for controlling the combustion noise may also be better learned under engine idle conditions.

If idling conditions are not present, routine 700 may end. If idling conditions are confirmed, routine 700 may progress to 704 to measure current engine speed. Engine speed may be generated from the profile ignition pickup signal (PIP) from Hall effect sensor 118 coupled to the crankshaft (as described earlier in reference to FIG. 1). Based on the measured engine idle speed, a fuel mass injection correction may be learned, at 706, to meet a desired idle speed.

Figure 10:
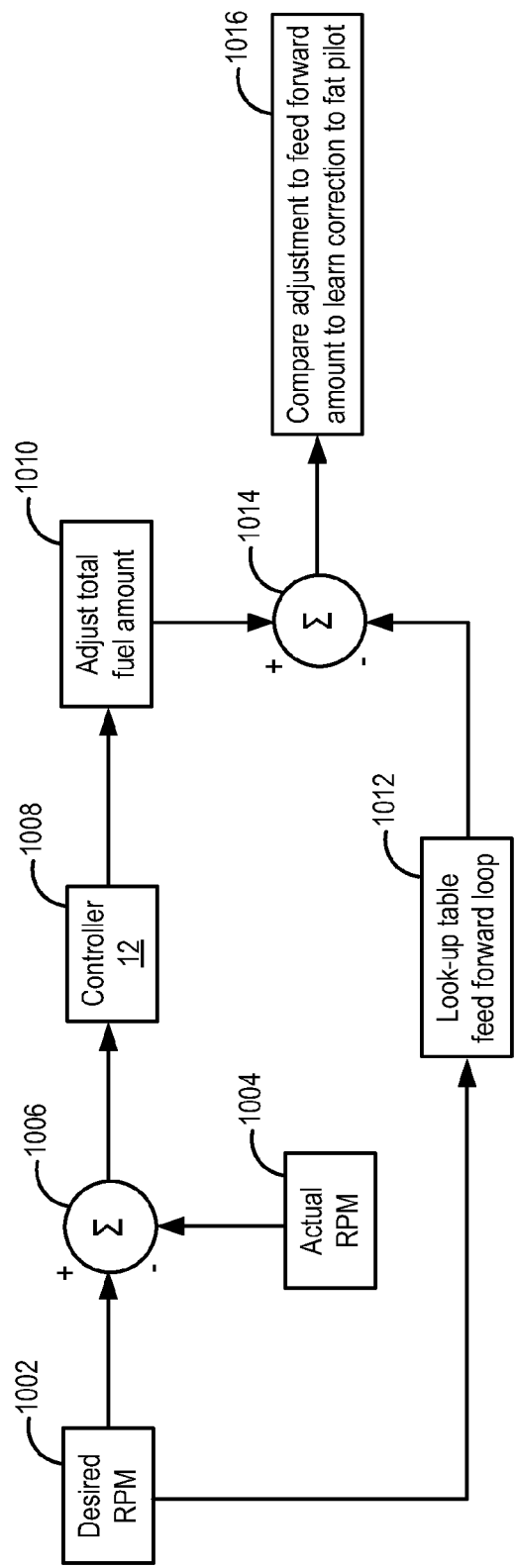
FIG. 10 illustrates a control operation for idle speed manipulation.
Figure 11:
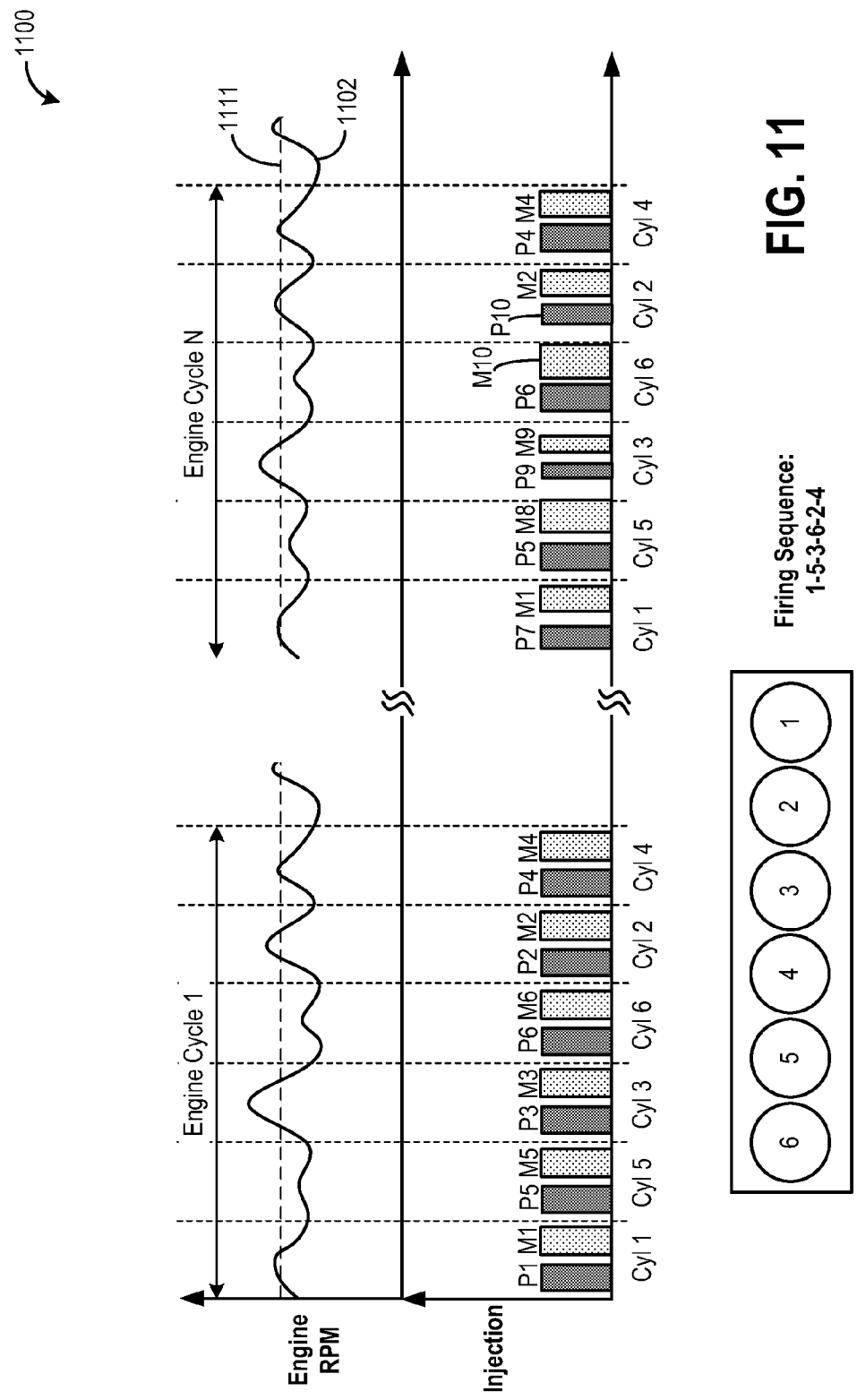
FIG. 11 displays an example adjustment to injection quantities based on engine speed.

FIG. 10 shows an example block diagram of a control system for idle speed control. Specifically, the control system learns a correction to the fat pilot injection during idling conditions by comparing a desired idle speed with an actual idle speed.

At 1002, desired engine speed during idling may be determined. The controller may, for example, base the desired idle speed on a desired power output wherein the desired power output is dependent on vehicle accessories that may be operational during idling. For example, a higher engine speed may be desired during idle when an air conditioning system is operational.

Accessories such as headlights, radio, windshield wiper system, etc. may draw lower power than an air conditioning system. Therefore, a lower engine speed may be determined if the air conditioning system is disabled but the headlights and the windshield wiper system are activated.

At 1004, the actual, measured engine speed may be determined (as described at 704 of routine 700). At 1006, a difference between the desired engine speed and the actual speed may be determined and the error may be communicated at 1008 to a controller, e.g. controller 12 of engine 10 of FIG. 1. In response to the determined error between the desired and actual engine speeds, the controller may adjust a total fuel amount delivered by the fuel injectors to the engine. In one example, if the adjustment indicated is a downward adjustment, an initial higher pilot injection quantity may be decreased. In another example, if the determined adjustment is upward, a main injection quantity may be increased.

Simultaneously, the desired engine speed (at 1002) may be used in a feed-forward loop at 1012 to determine a desired total fuel amount based on a look-up table. A difference between the feed-forward total fuel amount and the adjusted total fuel amount from 1010 may be estimated at 1014. Further, this difference between the adjusted total fuel amount and the feed-forward total fuel amount may be used by the controller at 1016 to learn a correction to the fat pilot injection.

Returning now to routine 700, at 708, an individual injector correction may be learned for each injector based on crankshaft velocity. Specifically, the individual injector correction may create a mean set of injectors for providing stable idle with cylinder balance. Cylinder-to-cylinder variations in torque output may produce variations in crankshaft speed resulting in reduced cylinder balance. Engine instability may be particularly evident during idling conditions. Accordingly, idling conditions may facilitate faster and easier learning of deviations in injector flow so that individual fueling corrections may be applied for improved balance.

FIG. 11 depicts an example correction based on individual cylinder contributions to engine speed. Map 1100 shows engine speed (RPM) along the y-axis of the top plot against cylinder number on the x-axis. The illustrated example features a six-cylinder engine with a firing sequence: 1-5-3-6-2-4. The bottom plot portrays fuel injection profile for each cylinder. Further, each fuel injection profile includes a pilot injection (densely dotted block) and a main injection (sparsely dotted block). Post injections are not incorporated for the purpose of clarity.

The first graph on the left hand side depicts a first engine cycle (Engine cycle 1) and its corresponding engine speed along with fuel injection profiles per cylinder. The first engine cycle may be a first engine cycle immediately following vehicle manufacture. Alternatively, the first engine cycle may be a first engine cycle for a given time, e.g. today, a current engine start, etc.

Individual cylinder contributions to crankshaft (or engine) speed may be determined by specific sensors such as combustion sensors determining cylinder pressure. In another example, measured angular velocity of the crankshaft may enable identification of cylinder-to-cylinder variations in speed. In yet other embodiments, relative torque contributions of each cylinder may be estimated via PIP signals measuring crankshaft velocity.

The measured engine speed is depicted as plot 1102. A desired engine speed is depicted as line 1111. In the first graph on left hand side, each cylinder may receive a similar amount of fuel as a pilot injection and an equal amount of fuel as a main injection. For example, cylinder 1 receives portion P1 as the pilot injection while cylinder 6 receives a portion P6 as its pilot injection. In the example shown, portion P1 may be similar to portion P6. Similarly, cylinder 3 is injected with a portion M3 as a main injection while a portion M2 of fuel is delivered to cylinder 2. In the depicted example, portions M2 and M3 may be substantially equal amounts. In other examples, the injected fuel amounts may be different.

With the given fuel injection profile, cylinder-to-cylinder variations in engine speed may be observed as shown by plot 1102. Cylinder 1 contributes a slightly higher than desired speed to the crankshaft while cylinder 5 provides a significantly lower than desired speed. Cylinders 3 and 2 provide a higher than desired output while cylinder 6 contributes a lower than desired speed. Cylinder 4 is shown providing a desired output.

Based on the learned cylinder-to-cylinder variations, the controller may adjust the fuel injection profiles to provide a desired cylinder balance. Accordingly, the pilot injection amount in each cylinder may be learned and only adjusted downward (toward a smaller amount of fuel for that injection). Further, the main injection amount for each cylinder may be learned and adjusted either upward or downward to produce the desired torque.

In the example of FIG. 11, the right hand side graph shows an engine cycle N which may be a cycle that follows engine cycle 1. In one example, engine cycle N may be engine cycle 2. In other words, it may be the cycle immediately subsequent to engine cycle 1. In another example, engine cycle N may be engine cycle 7. In other words, there may be multiple engine cycles (e.g. 5 engine cycles) between engine cycle N and engine cycle 1.

In engine cycle N, the fuel injection profiles for each cylinder have been adapted based on the learnings from engine cycle 1 (and following cycles). Therefore, cylinder 1 may be fueled by a slightly lower portion P7 of pilot injection to reduce actual speed to desired speed. The portion of main injection M1 in cylinder 1 may be the same as in engine cycle 1. Cylinder 5 is shown receiving a relatively higher portion M8 of main injection to increase cylinder output and produce an actual engine speed closer to desired speed. Herein, since an increase in fuel is commanded, the quantity of main injection is increased. The pilot injection in cylinder 5 may not be increased in the learning phase. Therefore, pilot injection portion P5 may be the same in engine cycle N as in engine cycle 1.

Continuing with FIG. 11, in engine cycle N, cylinder 3 may receive a substantially reduced portion of each of pilot injection and main injection to achieve desired speed. Thus, portion P9 of pilot injection and portion M9 of main injection may be smaller than respective portions (P3 and M3) in engine cycle 1. Cylinder 6 may receive a higher portion M10 of main injection while the pilot injection portion P6 is the same as in engine cycle 1. Cylinder 2 may receive a smaller portion P10 as pilot injection relative to engine cycle 1. However, main injection portion M2 may be the same quantity as that delivered to cylinder 2 in engine cycle 1. Meanwhile, cylinder 4 may receive the same portions of fuel as pilot injection and main injection as that received during engine cycle 1 since the output of cylinder 4 was/is at a desired level.

Thus, during the learning phase, solely the main injection may be increased to increase cylinder output. To reduce cylinder output, either or both of a pilot injection and the main injection quantities may be decreased.

It will be appreciated that though not shown herein, post injection quantities may also be adjusted upward and downward based on desired cylinder output.

In this way, during idling conditions, a fuel mass correction and an individual injector flow correction may be learned. Adjustments to the pilot injection during the learning phase may be only in the downward direction. The main injection (and post injections) may be adjusted upward or downward based on the learned corrections. By learning these corrections during idling conditions, a more accurate and easier adaptive learning may be ensured.

Figure 8:
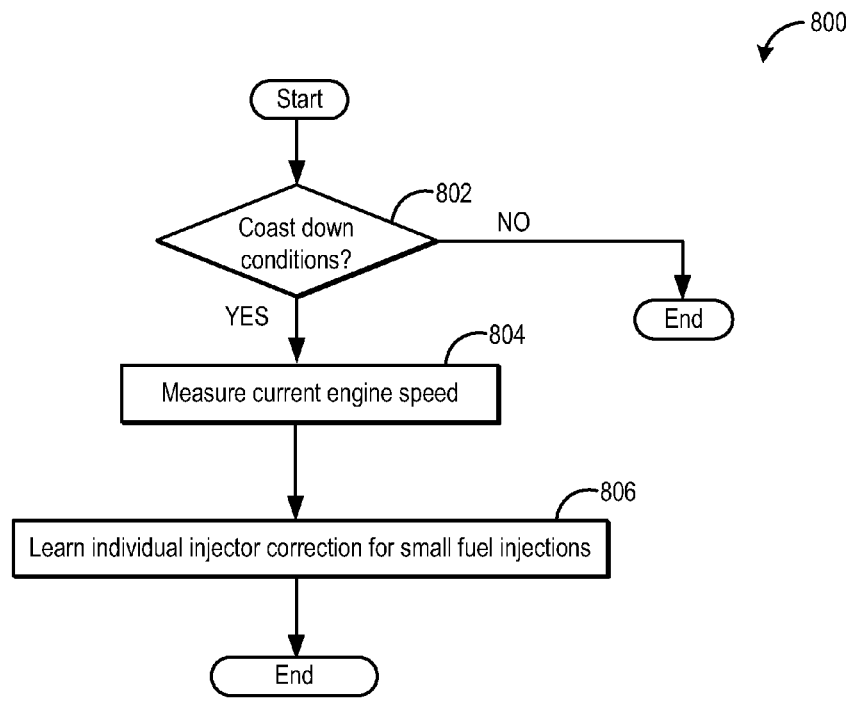
FIG. 8 illustrates an example flowchart for learning an injector flow characteristic during coast down conditions.

Turning now to FIG. 8, a routine 800 is illustrated for learning pilot injection corrections during coast down conditions. Specifically, individual injector corrections may be learned based on engine speed signals. Coast down conditions may use smaller quantities of fuel for combustion due to lower torque demands.

At 802, the presence of coast down conditions may be confirmed. For example, coast down conditions may be determined based on vehicle speed and pedal position signal received from the accelerator pedal sensor. Coast down conditions may be determined when vehicle speed is greater than zero and when the accelerator pedal is in a fully released position. Further, the vehicle may be decelerating during coast down conditions with a brake pedal being in a released position. In another example, torque demand along with the conditions listed above may be used to determine coasting conditions.

If coast down conditions are determined to be absent, routine 800 may end. Else, routine 800 continues to 804 to measure current engine speed. As described earlier in reference to FIG. 7, engine speed may be generated from PIP signals received by the Hall effect sensor coupled to the crankshaft.

At 806, individual injector correction may be learned based on crankshaft acceleration. Similar to routine 700, crankshaft acceleration per cylinder may be learned based on cylinder-to-cylinder variations in output. PIP signals received from the Hall effect sensor coupled to the crankshaft may provide information regarding crankshaft acceleration and individual cylinder contributions.

Figure 9:
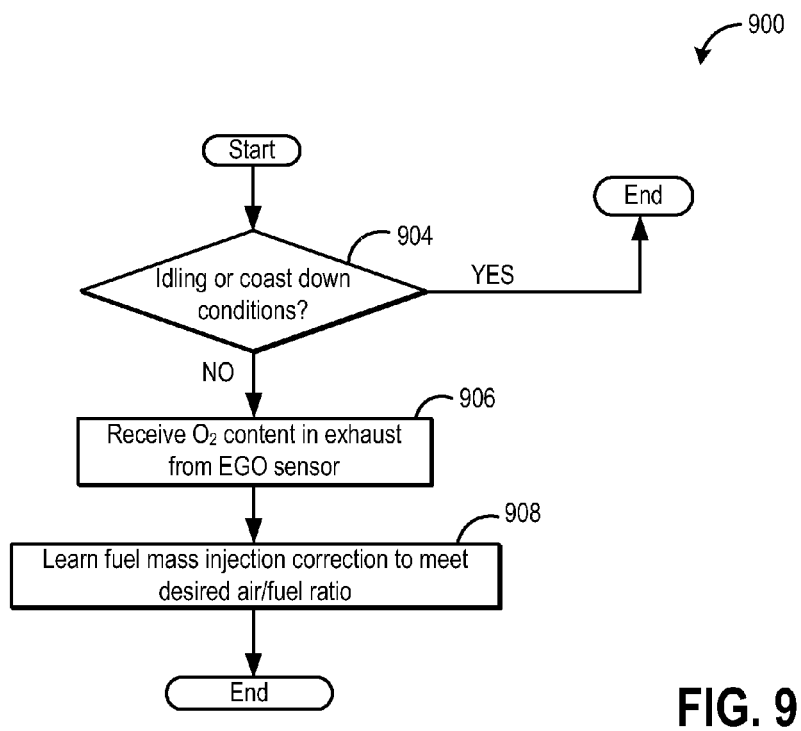
FIG. 9 shows an example flowchart for learning an injector flow characteristic during non-idling, non-coast down conditions.

In this way, adaptive learning for smaller pilot injections may be performed during coast down conditions. Coast down conditions may offer a driving condition distinct from idling conditions wherein the torque demand may be different. Therefore, fuel injection profiles may be unlike those used during idling. Turning now to FIG. 9, it shows routine 900 for determining corrections to injector flow during driving conditions that do not include either idling or coast down conditions. Other entry conditions for routine 900 may include an emission control device being above light-off temperature, non-transient conditions, etc. Specifically, a fuel mass injection correction is learned that is based on exhaust gas sensor output.

At 904, routine 900 may confirm if either idling or coast down conditions are present. If yes, the routine may end. If no, routine 900 may continue to 906 to receive an oxygen content reading from an exhaust gas sensor. In another example, oxygen content may also be received from a feedgas NOx sensor in the exhaust passage. At 908, a fuel mass injection correction may be learned based on the content of oxygen in the exhaust. For example, the correction may enable meeting a desired air/fuel ratio. Herein, the set of injectors coupled to the cylinders may be trimmed to flow a desired fuel mass.

In this way, corrections to injector flow may be obtained during distinct driving conditions. By learning and adapting pilot injections in a variety of conditions, a more precise adaptation of pilot injection quantity may be ensured. Further, by reducing the likelihood of mis-calibration of the pilot injection, combustion noise and emissions may be reduced.

Thus, a method for an engine in a vehicle may comprise adjusting downward a first proportion of fuel delivered as a pilot injection responsive to an injector flow characteristic learned during initial engine operation, the initial engine operation including one of a first number of miles of vehicle operation from vehicle manufacture, a given number of operating hours after vehicle manufacture, and attainment of stable values for the learned injector flow characteristic. Herein, the first proportion of fuel delivered as the pilot injection may only be adjusted downward. Further, a second proportion of fuel may be injected as a main injection following the pilot injection. Additionally, a third proportion of fuel may be delivered as a post injection following the main injection. Each of the second proportion and the third proportion may be adjusted based on the injector flow characteristic learned during initial engine operation. Furthermore, each of the second proportion and the third proportion may be adjusted both upward and downward.

In one example, the learned injector flow characteristic may be fuel mass that may be learned during idle conditions. Herein, the injector flow characteristic may be based on crankshaft speed. The learning may include learning an error based on corrections to fuel mass to maintain a desired engine idle speed. In another example, the injector flow characteristic may be learned based on exhaust gas sensor output during non-idle and non-coast down conditions. Further, the learning of injector flow characteristic may include learning an error based on corrections to fuel mass to maintain a desired air/fuel ratio. In yet another example, the learned injector flow characteristic may be fuel quantity which may be learned during coast down conditions. Herein, the learned injector flow characteristic may be based on crankshaft acceleration. Alternatively, the injector flow characteristic may be learned based on cylinder balance during engine idle conditions, and the learning may include learning an error based on corrections to individual injection quantity for maintaining stable idle conditions.

In this way, a pilot injection may be controlled based on adaptive learning during various engine operating conditions. By operating the engine initially with a larger proportion of pilot injection, NVH issues in a new vehicle may be addressed by decreasing the likelihood of errors in pilot injection calibration. Lengthy, on-bench calibrations of new injectors may be reduced by learning corrections to the pilot injection quantity under actual driving conditions. Further, a more accurate determination of each injection (e.g., pilot, main) quantity may be achieved by learning injector flow characteristics under a variety of driving conditions. Consequently, emissions may be reduced providing improved emissions compliance.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
   during initial engine operation from vehicle manufacture, delivering a first proportion of fuel as a first pilot injection and a second pilot injection in a single engine stroke; and
   only decreasing the first proportion of fuel responsive to detecting an injector flow characteristic, where decreasing the first proportion of fuel includes decreasing each of the first pilot injection and the second pilot injection.

2. The method of claim 1, wherein initial engine operation includes one of a given number of miles of vehicle operation after vehicle manufacture, a given number of operating hours after vehicle manufacture, and attainment of stable values for injector flow characteristics.

3. The method of claim 1, further comprising delivering a second proportion of fuel as a main injection following the first pilot injection and the second pilot injection, learning the injector flow characteristic, and adjusting the second proportion of fuel to both increase and decrease responsive to the detecting.

4. The method of claim 3, further comprising delivering a third proportion of fuel as a post injection following the main injection, detecting the injector flow characteristic, and adjusting the third proportion of fuel responsive to the detected injector flow characteristic.

5. The method of claim 4, wherein the adjusting is each of increasing and decreasing the third proportion of fuel delivered as the post injection.

6. The method of claim 4, wherein the injector flow characteristic is fuel mass.

7. The method of claim 6, wherein the injector flow characteristic is detected during idle conditions, and wherein the injector flow characteristic is based on crankshaft speed.

8. The method of claim 7, wherein detecting an injector flow characteristic includes detecting an error based on corrections to fuel mass to maintain a desired engine idle speed.

9. The method of claim 6, wherein the injector flow characteristic is detected based on exhaust gas sensor output during non-idle and non-coast down conditions, and wherein the detecting an injector flow characteristic includes detecting an error based on corrections to fuel mass to maintain a desired air/fuel ratio.

10. The method of claim 4, wherein the injector flow characteristic is fuel quantity.

11. The method of claim 10, wherein the injector flow characteristic is detected during coast down conditions, and wherein the detected injector flow characteristic is based on crankshaft acceleration.

12. The method of claim 10, wherein the injector flow characteristic is detected based on cylinder balance during engine idle conditions, and wherein the detecting includes detecting an error based on corrections to individual injection quantity for maintaining stable idle conditions.

13. A method for an engine in a vehicle, comprising:
adjusting downward a first proportion of fuel delivered as a pilot injection responsive to an injector flow characteristic detected during initial engine operation, the initial engine operation including one of a first number of miles of vehicle operation from vehicle manufacture, a given number of operating hours after vehicle manufacture, and attainment of stable values for the detected injector flow characteristic, wherein a second proportion of fuel is injected as a main injection following the pilot injection, and wherein a third proportion of fuel is injected as a post injection following the main injection; and
adjusting each of the second proportion and the third proportion based on the injector flow characteristic detected during initial engine operation, and wherein the adjusting of each of the second proportion and the third proportion includes adjusting each of the second and third proportions both upward and downward.

14. The method of claim 13, wherein the first proportion of fuel delivered as the pilot injection is only adjusted downward.

15. A method for an engine in a vehicle, comprising:
during initial engine operation from vehicle manufacture,
delivering a first proportion of fuel as a pilot injection;
only decreasing the first proportion of fuel responsive to detecting an injector flow characteristic;
delivering a second proportion of fuel as a main injection following the pilot injection, detecting the injector flow characteristic, and adjusting the second proportion of fuel to both increase and decrease responsive to the detecting; and
delivering a third proportion of fuel as a post injection following the main injection, detecting the injector flow characteristic, and adjusting the third proportion of fuel responsive to the detected injector flow characteristic.

16. The method of claim 15, wherein the adjusting is each of increasing and decreasing the third proportion of fuel delivered as the post injection.

17. The method of claim 15, wherein the injector flow characteristic is fuel mass.

18. The method of claim 17, wherein the injector flow characteristic is detected during idle conditions, and wherein the injector flow characteristic is based on crankshaft speed.

19. The method of claim 18, wherein detecting an injector flow characteristic includes detecting an error based on corrections to fuel mass to maintain a desired engine idle speed.

20. The method of claim 15, wherein the injector flow characteristic is fuel quantity.

* * * * *